United States Patent [19]

Ohura

[11] E Patent Number: Re. 32,749

[45] Reissued Date of Patent: Sep. 13, 1988

[54] PATTERN DISPLAY SYSTEM

[75] Inventor: Toshio Ohura, Tokyo, Japan

[73] Assignee: Nippon Electric Co., Ltd., Tokyo, Japan

[21] Appl. No.: 673,135

[22] Filed: Nov. 19, 1984

Related U.S. Patent Documents

Reissue of:

[64] Patent No.: 4,360,804
Issued: Nov. 23, 1982
Appl. No.: 137,800
Filed: Apr. 7, 1980

[30] Foreign Application Priority Data

Apr. 10, 1979 [JP] Japan ..... 54-43494

[51] Int. Cl.[4] ..... G09G 1/28

[52] U.S. Cl. ..... 340/703; 340/723; 340/803; 358/22; 358/81

[58] Field of Search ..... 340/701, 703; 358/81, 358/82, 10, 903, 56

[56] References Cited

U.S. PATENT DOCUMENTS

| | | | |
|---|---|---|---|
| 3,911,418 | 10/1975 | Takeda | 340/703 |
| 4,139,838 | 2/1979 | Inose et al. | 340/703 |
| 4,149,184 | 4/1979 | Giddings et al. | 340/703 X |
| 4,156,237 | 5/1979 | Okada et al. | 340/701 |
| 4,183,046 | 1/1980 | Dalke et al. | 358/81 X |
| 4,232,311 | 11/1980 | Agnetta | 340/701 X |

*Primary Examiner*—David L. Trafton
*Attorney, Agent, or Firm*—Samuels, Gauthier, Stevens & Kehoe

[57] ABSTRACT

In a pattern display system wherein color signals are produced based on serial color data signals of red, green and blue and background colors from background color information storage means and a color pattern is displayed on predetermined picture elements in response to the color signals and an output of a voltage level signal generating circuit, there is provided color control information storage means, and amplitudes of the voltage level signal and the color signal are controlled by color control information from the storage means, so that the color pattern display can be effected with deep, pale, bright and dark properties of color controlled.

9 Claims, 5 Drawing Sheets

FIG.5

| MD | BW | NB | LT | DISPLAYED COLOR | P = H | P = L | BACKGROUND |
|---|---|---|---|---|---|---|---|
| 0 | 0 | 0 | 0 | A GROUP (RED, BLUE, GREEN, ORANGE, MAGENTA YELLOW, BLUE-CYAN, GREEN-CYAN) | PALE BRIGHT B GROUP | PALE BRIGHT A GROUP | PALE DARK A GROUP |
| 0 | 0 | 0 | 1 | | PALE BRIGHT B GROUP | PALE BRIGHT A GROUP | PALE BRIGHT A GROUP |
| 0 | 0 | 1 | 0 | B GROUP (RED-ORANGE, YELLOW-ORANGE, YELLOW-GREEN, BLUE-VIOLET RED-VIOLET, GREEN GREEN-CYAN, CYAN, BLUE BLUE-CYAN) | PALE BRIGHT B GROUP | DEEP DARK A GROUP | DEEP DARK A GROUP |
| 0 | 0 | 1 | 1 | | PALE BRIGHT B GROUP | DEEP BRIGHT A GROUP | DEEP BRIGHT A GROUP |
| 0 | 1 | 0 | 0 | C GROUP (WHITE, BLACK, RED, BLUE, GREEN, MAGENTA YELLOW, GREEN-CYAN) | DEEP BRIGHT D GROUP | PALE DARK C GROUP | PALE DARK C GROUP |
| 0 | 1 | 0 | 1 | | DEEP BRIGHT D GROUP | PALE BRIGHT C GROUP | PALE DARK C GROUP |
| 0 | 1 | 1 | 0 | D GROUP (WHITE, BLACK, RED-ORANGE, YELLOW-GREEN, CYAN GREEN GREEN-CYAN, BLUE-VIOLET, RED-VIOLET) | DEEP BRIGHT D GROUP | DEEP DARK C GROUP | DEEP DARK C GROUP |
| 0 | 1 | 1 | 1 | | DEEP BRIGHT D GROUP | DEEP BRIGHT C GROUP | DEEP DARK C GROUP |
| 1 | 0 | 0 | 0 | A GROUP (RED, BLUE, GREEN, ORANGE, MAGENTA YELLOW, BLUE-CYAN, GREEN-CYAN) | PALE BRIGHT A GROUP | PALE BRIGHT B GROUP | PALE DARK B GROUP |
| 1 | 0 | 0 | 1 | | PALE BRIGHT A GROUP | PALE BRIGHT B GROUP | PALE BRIGHT B GROUP |
| 1 | 0 | 1 | 0 | B GROUP (RED-ORANGE, YELLOW-ORANGE, YELLOW-GREEN, BLUE-VIOLET RED-VIOLET, GREEN GREEN-CYAN, CYAN, BLUE BLUE-CYAN) | PALE BRIGHT A GROUP | DEEP DARK B GROUP | DEEP DARK B GROUP |
| 1 | 0 | 1 | 1 | | PALE BRIGHT A GROUP | DEEP BRIGHT B GROUP | DEEP BRIGHT B GROUP |
| 1 | 1 | 0 | 0 | C GROUP (WHITE, BLACK, RED, BLUE, GREEN, MAGENTA YELLOW, GREEN-CYAN) | DEEP BRIGHT C GROUP | PALE DARK D GROUP | PALE DARK D GROUP |
| 1 | 1 | 0 | 1 | | DEEP BRIGHT C GROUP | PALE BRIGHT D GROUP | PALE DARK D GROUP |
| 1 | 1 | 1 | 0 | D GROUP (WHITE, BLACK, RED-ORANGE, YELLOW-GREEN, CYAN GREEN GREEN-CYAN, BLUE-VIOLET, RED-VIOLET) | DEEP BRIGHT C GROUP | DEEP DARK D GROUP | DEEP DARK D GROUP |
| 1 | 1 | 1 | 1 | | DEEP BRIGHT C GROUP | DEEP BRIGHT D GROUP | DEEP DARK D GROUP |

PATTERN DISPLAY SYSTEM

Matter enclosed in heavy brackets [ ] appears in the original patent but forms no part of this reissue specification; matter printed in italics indicates the additions made by reissue.

BACKGROUND OF THE INVENTION

This invention relates to a pattern display system wherein a color pattern is displayed by scanning a picture screen through raster scanning.

To display various chromatic patterns such as characters, figures or symbols at arbitrary positions on a picture screen by a control system having a program processing function such as by a micro-processor, it has been general practice to store programmable pattern positions, pattern shapes and color data in memories and to display a color pattern sequentially on picture elements by addressing the memories. In such a conventional practice, in order to provide color data for each pattern, the color information is read out directly from a memory which stores color information at positions corresponding to the pattern through DMA (Direct Memory Access) and sent to a color difference generator to circuit which produces predetermined color signals which control the irradiation of beams of electron for color display. Generally, at least three memories are required for storing each color information of red, blue and green, each memory having a memory capacity equal to the number of patterns to be displacyed on the picture screen. Therefore, with three memories for storing color information of respective red, blue and green, the number of colors corresponding to the color data storage in each memory, i.e., $2^3=8$ can be displayed. More particularly, there can be displayed three colors of red, blue and green and five additional colors accuring from possible combinations of the three colors, namely, red+blue=magenta, red+green=yellow, blue+green=cyan, red+blue+green=white, and black. However, with recent trend to display complicated patterns, the types of colors have been diversified in order to clearly display each pattern. To meet such a trend, it is necessary to change mixing percentage of red, blue and green by increasing the number of color data storing memories. However, increasing memories will inconveniently raise the cost. Further, when it is desired that the number of patterns to be displayed on the picture screen be increased and high resolution be required of the pattern, the capacity required for one memory increases, adding more economic burdens.

SUMMARY OF THE INVENTION

It is an object of the present invention to provide a novel pattern display system which can produce a variety of colored patterns without increasing memory capacity.

A color pattern display system of the present invention comprises serial color data signals of red, blue and green, serial control signal which designates priority pattern display and memory means to store color control information. The serial color data signals and serial control signal are combined to produce color signals. Deep, pale, bright and dark properties of the color signals are controlled by the color control information in the memory means so as to display a color pattern on predetermined picture elements.

BRIEF DESCRIPTION OF THE DRAWINGS

FIG. 5 is a logical table showing controlled conditions of display colors.

DESCRIPTION OF THE PREFERRED EMBODIMENTS

Figure 1:
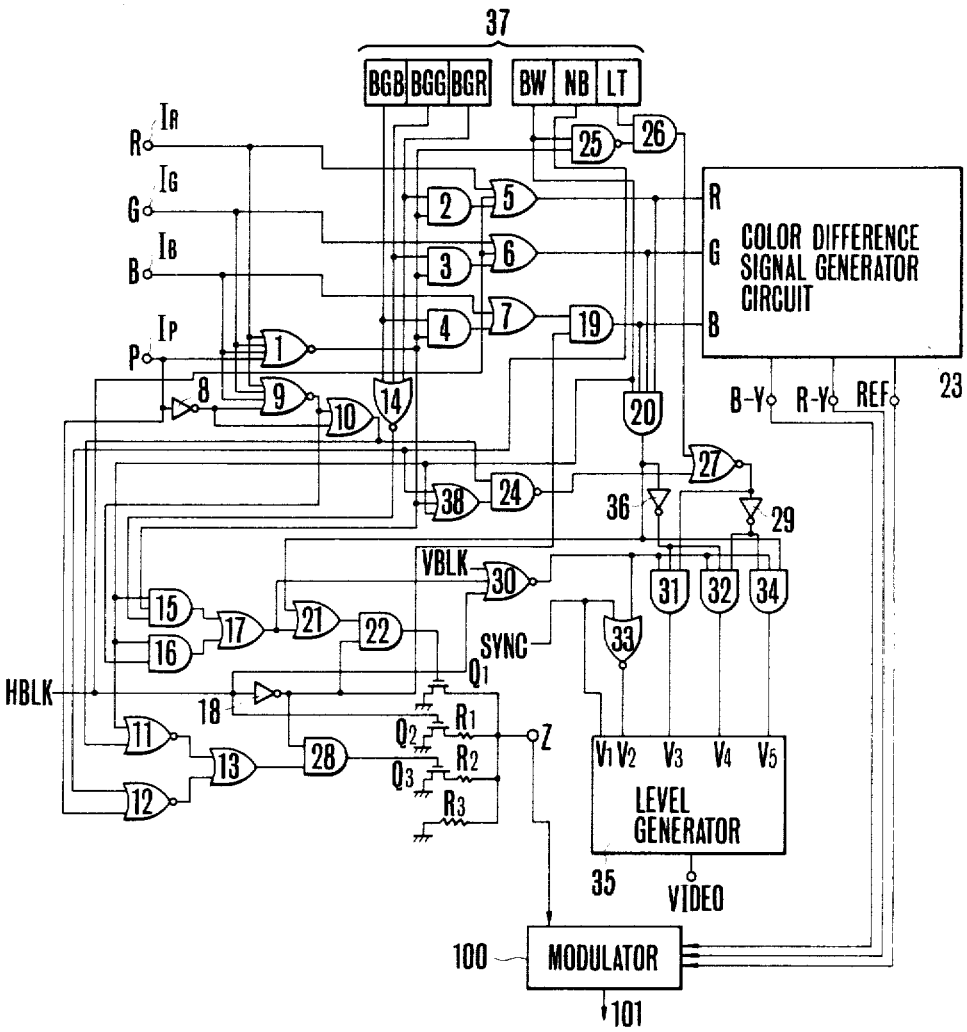
FIG. 1 is a circuit diagram of a color pattern generating unit showing an embodiment of a pattern display system according to the present invention.

The present invention will now be described by way of examples with reference to the accompanying drawings:

FIG. 1 is a block diagram to show main parts of a unit for generating a pattern in a variety of colors wherein the color data of three colors, i.e. red (R), green (G) and blue (B), which are read out of a color data memory (not shown) corresponding to each pattern, are supplied in 3-bit parallel from respective input terminals IR, IG and IB. At a stage prior to the input terminals IR, IG and IB, there is provided a color data register (not shown) in which color data, which are edited each on one horizontal scanning line and displayed on one scanning line, are sequentially stored. A priority pattern signal input terminal Ip is provided in addition to the color data input terminals IR, IG and IB. From the input terminal IP there is supplied a signal to indicate which pattern should have the priority in the display when a plural number of colors, characters or figures have to be displayed on the same element. The priority pattern signal is the signal data programmed in a pattern command storage RAM (Random Access Memory), not shown, together with color data and is read out on the input terminal Ip by the address data which also reads out the color data. Therefore, the color data which is supplied along with a priority pattern signal of high level ("H" level) will have the highest priority to be displayed on a picture element. The R, G and B signals are supplied to corresponding input terminals of a color difference signal generator circuit 23 via OR gates 5, 6 and 7. The color difference signal generator circuit 23 decodes each signal level of R, G and B through a matrix circuit and delivers color signals of ternary levels of "0", "1", "−1" from the output terminals, R-Y and B-Y, to a modulation circuit 100. The ternary levels are compared with a reference level of "0" transmitted from an output terminal REF so as to be identified as "1","−1" or "0" respectively inside the modulation circuit 100. The modulation circuit 100 modulates in quadrature phase the chrominance subcarrier signal by the color signals supplied from the color difference signal generator circuit 23, controls the amplitude of the subcarrier according to the impedance at a terminal Z (which will be explained later) and transmits the same to an antenna terminal of a TV set as a chrominance carrier signal 101 together with the luminance signal from a level generator 35.

Table 1 shows the output signals R-Y and B-Y corresponding to each combination of R, G, B signals.

TABLE 1

| R | G | B | B-Y | R-Y |
|---|---|---|---|---|
| 0 | 0 | 0 | 1 | −1 |
| 0 | 0 | 1 | 1 | 0 |
| 0 | 1 | 0 | −1 | −1 |
| 0 | 1 | 1 | 0 | −1 |
| 1 | 0 | 0 | 0 | 1 |
| 1 | 0 | 1 | 1 | 1 |
| 1 | 1 | 0 | −1 | 0 |
| 1 | 1 | 1 | −1 | 1 |

The color pattern generating unit of this invention further has six flip-flops 37 where background colors and color control signals are stored. The color data of blue, green and red which are to be displayed as background colors are stored in flip-flop BGB, BGG and BGR. When black or white is displayed, "H" level is set in BW; when no patterns are displayed, "H" level is set in NB; and when bright colors are displayed, "H" level is set in LT. The background color is supplied into the corresponding matrix circuit of the color difference signal generator circuit 23 when no patterns are displayed, i.e., R, G, B and P signals are at "L" level, and is converted into color signals and transmitted as background color display signals from the output terminals B-Y and R-Y to the modulation circuit 100. The background colors are displayed on picture elements which are not occupied by patterns. Accordingly, the respective background colors BGB, BGG and BGR are supplied to AND gates 2, 3 and 4 which are enabled by the output from a NOR gate 1 which detects if R, G, B and P signals are all at "L" level and are then sent to the color difference signal generator circuit 23 via OR gates 5, 6 and 7 at the next stage.

Figure 2:
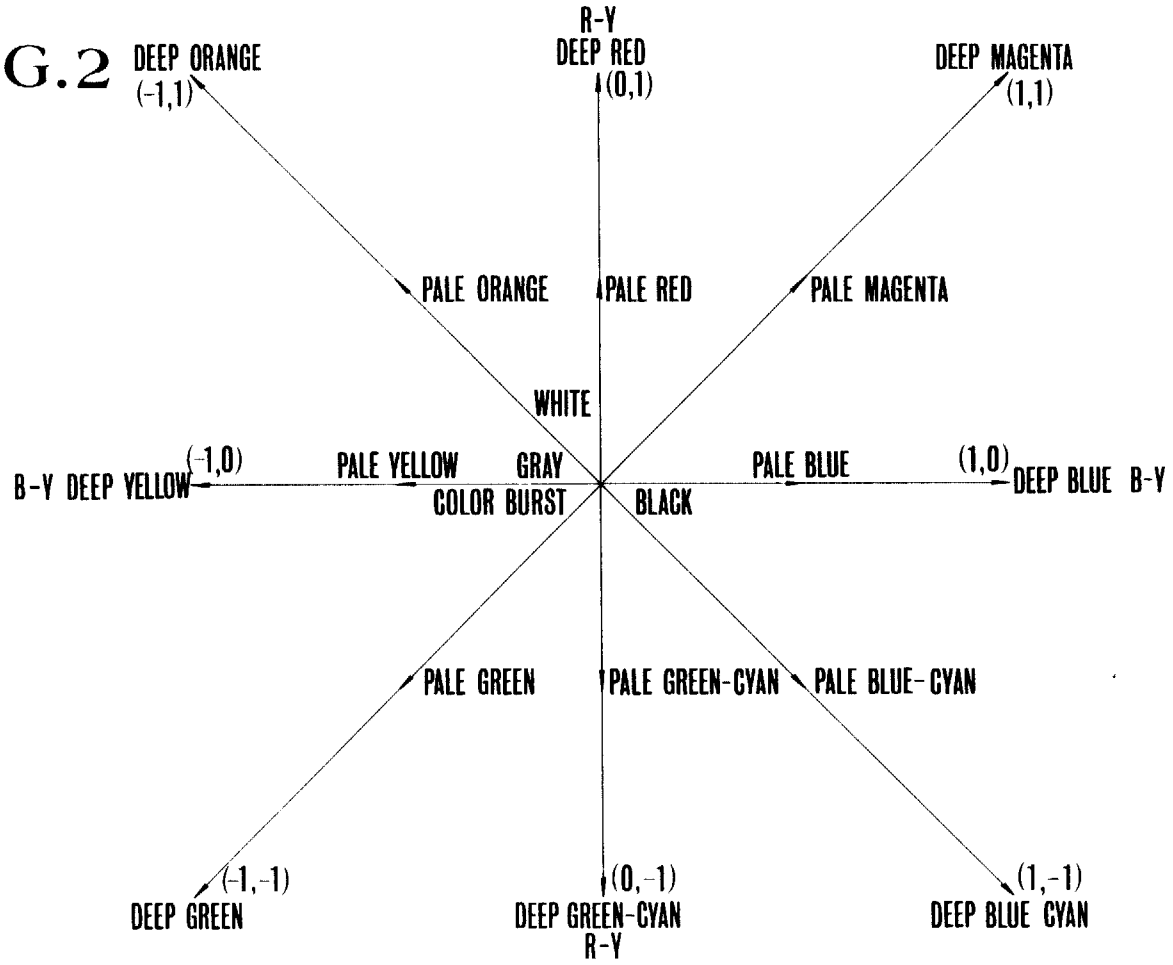
FIG. 2 is a vector diagram of chrominance subcarrier.

The types of colors produced on the picture screen of a receiver set based upon B-Y and R-Y signals which are fed to the modulation circuit 100 from the color difference signal generator circuit 23 will now be described with reference to a vector diagram in FIG. 2. The ternary levels of "1", "0", "−1" are produced from the output terminals B-Y and R-Y dependent on combinations of R, G and B indicated in Table 1. In FIG. 2 where ordinate represents the R-Y signal and abscissa the B-Y signal, as indicated in Table 1, when the coordinate position of combination of (B-Y, R-Y) is (1,0), blue is displayed, when it is (0,1), red is displayed, when it is (−1, −1), green is displayed. Additionally, blue-cyan for (−1, −1), green-cyan for (0, −1), magenta for (1,1), yellow for (−1,0) and orange for (−1,1) are displayed, thus providing 8 colors in total. This embodiment of the present invention enables 32 types of color to be displayed by changing deep, pale, bright and dark properties of the 8 color patterns by means of the control operation to be described later. Additionally, the display of three colors, i.e. white, gray and black is obtained at origin of the vector in FIG. 2, thereby providing 35 types of color patterns in total.

In the embodiment of the present invention, in order to achieve the 35 color display, there are provided, in addition to the aforementioned circuits, the level generating circuit 35 which produces on a video output terminal VIDEO 5 voltage level signals, i.e., a synchronous voltage level V1, a black color display voltage level and blanking voltage level V2, a dark (gray) voltage level V3, a bright voltage level other than white V4 and a white bright voltage level V5, and the impedance terminal Z, which is connected to a gain control circuit of the modulation circuit 100 which controls the amplitude of the chrominance subcarrier, for controlling the amplitude of the color signals and hence deep-pale properties thereof. The impedance terminal Z is connected in parallel respectively to the drain terminals of N-channel insulation gate field effect transistors (which will be termed as IGFET hereinafter) Q1, Q2 and Q3, the source terminals of which are grounded. The drains of IGFETs Q2 and Q3 are connected to the terminal Z via resistors R1 and R2 and a resistor R3 having one terminal grounded is connected to the terminal Z in parallel with the other transistors. Resistances of the resistors R1, R2 and R3 and dynamic resistances r of IGFETs Q1, Q2 and Q3 are determined to satisfy the relation $R3>>R2>R1>r$ where $r=R1/4=R2/12=R3/100$. The impedance of the terminal Z is therefore changed by selecting signals supplied to the gates of IGFETs Q1, Q2 and Q3, thereby controlling the gain of the modulation circuit and, hence, the amplitude of the chrominance subcarrier. Namely, as the impedance at the terminal Z increases, the amplitude of the chrominance subcarrier increases, and the color becomes deeper. On the other hand, as the impedance at terminal Z decreases, the amplitude of the chrominance subcarrier decreases, and the color becomes paler with a disappearance of color at the amplitude of zero. In this embodiment, when transistor Q1 is turned on or when the impedance at the terminal Z is minimized amounting to the dynamic resistance r of the transistor Q1, patterns without hues, such as of white, gray or black, are displayed. When the transistor Q2 is turned on, and the impedance at the terminal Z becomes r plus R1, the color burst signal is produced. Therefore, the display of the patterns without hues becomes possible by making the resistance r of the transistor Q1 1/5 times (the resistance r of the transistor Q2 plus R1) which is effective to exert color killer on the color burst. When the transistor Q3 is turned on and the impedance of the terminal Z becomes r plus R2, patterns are displayed in pale color. The patterns in deep color are displayed, on the other hand, by turning off all transistors Q1, Q2 and Q3 to set the impedance at the terminal Z to R3, thereby controlling the chrominance subcarrier amplitude to a maximum.

The control signals to be supplied to the color difference signal generator circuit 23, the level generating circuit 35 and the impedance conversion output terminal as described above will now be explained. The control signals are generated by supplying horizontal and vertical blanking signals HBLK and VBLI and the synchronizing signal SYNC, in addition to the color data signals of R, G and B, the priority pattern display signal P, background color display signals BGB, BGG and BGR and color control signals BW, NB and LT, to logical gates shown in FIG. 1. As described in the foregoing, the signals R and G read out from the memory are supplied to R and G input terminals IR and IG of the color difference signal generator circuit 23 via OR gates 5 and 6. The signal B, on the other hand, is supplied to the B input terminal IB of the color difference signal generator circuit 23 via OR gate 7 and an AND gate 19. By supplying the horizontal blanking signal HBLN to the other terminal of AND gate 19 via an inverter 18, the B signal is permitted to be supplied to the color difference signal generator circuit 23 only when the horizontal blanking signal HBLK is at "L" level. The horizontal blanking signal HBLK is also supplied to OR gates 5 and 6 which receive R and G signals as input signals, and transmitted to the color difference signal generator circuit 23 along with R and G signals when the HBLK is at "H" level to produce yellow during a horizontal blanking period including a burst period. At the same time, the HBLK signal is further supplied to the gate of the transistor Q2 and transmitted to the gain control circuit of R-F modulation circuit 100 from the terminal Z as a burst signal of the impedance of a r plus R1. Signals from background color display flip-flops BGB, BGG and BGR are supplied to an AND gate 15 via a NOR gate 14. The output from the NOR gate 1, which receives at its input the signals R, G, B an P, and the output from the color control flip-flop BW are supplied to the other input terminals of the AND gate 15. The output of a NOR gate 9 which receives at its input the R, G and B, an inverted P signals via an inverter 8 and the output from the color control flip-flop BW are supplied to an AND gate 16. Both outputs from the AND gate 16 and the AND gate 15 are transmitted via an OR gate 17 to an OR gate 21 at the next stage and to a NOR gate 30 which is supplied with vertical blanking signal VBLK as an input. To the other input terminal of the OR gate 21 is supplied the output of an AND gate 20 which receives the output of BW flip-flop, and signals R and G from the OR gates 5 and 6, and the signal B through OR gate 7 and the AND gate 19. The output from the OR gate 21 and the inverted horizontal blanking signal HBLK are supplied to an AND gate 22 whose output is applied to the gate of the transistor Q1 having the smallest impedance value. The signal to be supplied to the gate of the transistor Q3 is the output from an AND gate 28 to which the inverted horizontal blanking signal HBLK and the output from an OR gate 13 are supplied. Outputs from two NOR gates 11 and 12 are connected to inputs of the NOR gate 13. The output from BW flip-flop which controls the display of color patterns without hues, for instance white or black, and the output from an OR gate 10 which receives the output of the NOR gate 9 supplied with inverted P signal and R, G and B signals and P signal inverted by the inverter 8 are supplied to the NOR gate 11. The output from the NB flip-flop which generates "H" level signal when patterns are not displayed and the priority pattern signal P are supplied to the OR gate 12. The output signals from the NOR gate 1, BW and NB flip-flops via an OR gate 38 and the output signal from the OR gate 10 are supplied to a NAND gate 24. A NAND gate 25 receives the output from the NOR gate 1 and the BW flip-flop. An AND gate 26 receives the output from the NAND gate 25 and the output from LT flip-flop for bright displays. The output of the AND gate 26 and the output from the NAND gate 24 are supplied to a NOR gate 27. The output from the NOR gate 27 is supplied to an AND gate 31 and the output from the NOR gate 27 which is inverted through an inverter 29 is supplied respectively to AND gates 32 and 34. The output from the AND gate 20 which receives the output of the BW flip-flop and R, G and B signals is supplied to the AND gate 34 and at the same time inverted by the inverter 36 to be fed to the AND gates 31 and 32. The horizontal and vertical blanking signals HBLK and VBLK as well as the output from the NOR gate which is connected to the OR gate 17 are supplied to the AND gates 31, 32 and 34. The output from this NOR gate 30 is also supplied to a NOR gate 33 together with the signal SYNC including equalizing pulses and synchronizing pulses. The outputs from the NOR gate 33 and the AND gates 31, 32 and 34 are respectively supplied to terminals V2, V3, V4 and V5 of the level generating circuit 35. To the V1 terminal are directly supplied the SYNC signal including the synchronizing pulses and the equalizing pulses. When this SYNC signal is at "H" level, either the horizontal or the vertical blanking signal becomes "H" level to apply voltage of the synchronizing level V1 from the level generating circuit 34 to the VIDEO terminal.

When the SYNC signal is at "L" level, i.e., during the period of blanking, either HBLK or VBLK is made to be at "H" level and "H" level output is selected by the NOR gate 33. Therefore, the output supplied to the VIDEO terminal of the level generating circuit 35 is the blanking voltage level V2. When black is desired to be displayed, the level for the black of V2 voltage is supplied to the VIDEO terminal by making the output of the OR gate 17 "H" level, opening the NOR gate 33, and closing the AND gates 31, 32 and 34. At this time, the lowest impedance is set at the Z terminal by opening the AND gate 22 and activating the transistor Q1. When a dark pattern is displayed, the NOR gate 27 is made to be at "H" level and the AND gate 31 alone is selected to transmit dark (gray) level of V3 voltage to the VIDEO terminal. When bright chromatic patterns other than white are displayed, the voltage level for the bright color V3 is transmitted by opening the AND gate 32 and closing the NOR gate 27 and the AND gate 20. By closing the NOR gate 27 and opening the AND gate 20, V5 voltage level is selected to display bright patterns in white.

Under such connections of the logical gates, when R, G and B and P signals are all at "L" level, or when neither priority pattern display nor color display is carried out, the NOR gate 1 becomes "H" level to open the AND gates 2 and 3 and the signals stored in the flip-flops RGB, BGG and BGR for background color are supplied to terminals R, G and B of the color difference signal generator circuit 23. In this case, the color difference signal generator circuit 23 determines the output signal conditions of B-Y and R-Y which display 8 colors of red, magenta, blue, blue-cyan, green-cyan, green yellow and orange by combining R, G and B signals (refer to Table 1 and FIG. 2). When all the flip-flops RBG, BGG and BGR for the background color are at "H" level and the horizontal blanking signal HBLK is at "L" level, the outputs B-Y and R-Y of the color difference signal generator circuit 23 have a value represented by (—1,1) to provide the signal for displaying orange shown in FIG. 2. However, since each "H" level signal of B, G and R is also supplied to the AND gate 20 together with the output signal from the BW flip-flop, when the BW flip-flop is at "H" level or when either black or white color display is addressed, "H" level signal is sent from the AND gate 20 to be supplied to the AND gate 34 connected to the terminal V5 of level generating circuit 35 which generates the signal level for displaying white bright patterns and to the AND gate 22 connected to the gate of the transistor Q1 which selects the smallest impedance. Since the inverted horizontal blanking signal HBLK is supplied to the other input terminal of the AND gate 22, the transistor Q1 is activated during the period other than for horizontal blanking so as to make the impedance at the terminal Z the smallest impedance r (dynamic resistance of Q1). Since the signal for the white bright level is transmitted during the period other than for blanking from the VIDEO terminal and the color signal for orange which is generated from the color difference signal generator circuit 23 is quadrature-phase modulated by the chrominance subcarrier signal in the modulation circuit 100 and since the amplitude of the phase-modulated chrominance carrier signal is made approximately zero by the input of the smallest impedance from the Z terminal, bright color of white is displayed. In the case where "L" level is delivered out from all the flip-flops for the background color memory, signals are supplied to the color difference signal generator circuit 23 only during the blanking period and the output of the NOR gate 14 becomes "H" level. By controlling "H" level signal from the flip-flop BW for black and white displays, the AND gate 15 is opened to activate the transistor Q1 as well as to make the NOR gate 30 "L" level so that a black level signal of V2 level is transmitted from the VIDEO terminal and the impedance at the terminal Z is minimized to display black patterns without hue. When the horizontal blanking signal HBLK is at "H" level or during the period of horizontal blanking, signals are supplied to the R and G input terminals IR and IG, of the color difference signal generator circuit 23, through the OR gates 5 and 6 to display yellow. At the same time the transistor Q2 is turned on to set the impedance at the terminal Z to (r+R1) value, the color difference signal showing yellow and generated from the color difference signal generator circuit 23 phase-modulates the chrominance subcarrier signal of 3.58 MHz, making the amplitude thereof equal to the amplitude of the burst signal of (r+R1) When SYNC signals including synchronizing pulses and equalizing pulses are at "L" level, the blanking level signal of V2 is supplied from the level generating circuit to the VIDEO terminal. As described in the foregoing, when the R, G and B signals representative of color data for displaying patterns programmed in advance and the P signal which controls the priority pattern display are at "L" level so that no patterns are displayed and when blanking is absent, background color display of 8 colors made by combining RGB, BGG and BGR and color display without hue black and white become possible depending upon the memory states in the flip-flops for the background color display.

When a color pattern is displayed according to the programs prepared in advance, since at least either one of R, G, B or P signals becomes "H" level, the NOR gate 1 is rendered "L" level, thereby disabling the AND gates 2, 3 and 4 which transmit the background color to the color difference signal generator circuit 23. When the R, G and B signal are at "L" level and P signal is "H" level, the NOR gate 9 becomes "H" level so that when the flip-flop BW for black-white display is at "H" level, the AND gate 16 is opened. As a result, during the display period other than the blanking period, the AND gate 22 becomes "H" level to minimize the impedance at the terminal Z. Also, the "H" level signal supplied to the NAND gate 24 via the OR gate 10 is converted into "L" level output because "H" level is supplied from the BW flip-flop to the other input terminal of the NAND gate 24. This "L" level signal is supplied to the NOR gate 27. However, since the output from the AND gate 26 is supplied to the other input terminal of the NOR gate 27 and since the flip-flop LT which displays bright patterns of white produces an "L" level output, the AND gate 26 is closed so as to supply the "L" level signal to the NOR gate 27. Therefore, the inputs to the NOR gate 27 are "L" and "L", and "H" level is supplied to V2 level input terminal of the level generating circuit 35 via the AND gate 31 while black level signal of V2 level is transmitted from the VIDEO terminal. When R, G, B and P signals are "L", "L", "L" and "H", respectively, and when the LT flip-flop is "L", black is displayed. When R, B and G signals are all at "H" level, as far as the flip-flop BW for white-black display is at "H" level, the AND gate 20 is enabled and "H" level is supplied to V5 input terminal of the level generating circuit 35 and to the transistor Q1 by the output H level of the AND gate 20 to display bright patterns of white.

When R, G and B signals are in signal conditions shown in Table 1, the color difference signals of the logical level indicated in Table 1 are produced from the color difference signal generator circuit 23 to display colors as shown in the vector diagram of FIG. 2. The color patterns shown in Table 2 can be displayed by setting signal conditions of the color controlling flip-flops BW, NB and LT and the priority pattern display signal P and by selecting suitable impedance which is supplied to the control circuit of the modulation circuit 100 from the terminal Z and suitable level signals transmitted from the output terminal VIDEO.

TABLE 2

| BW | NB | LT | Color displayed | P = L | P = L | background color |
|---|---|---|---|---|---|---|
| 0 | 0 | 0 | red, blue, green, yellow | pale bright | pale bright | pale dark |
| 0 | 0 | 1 | orange, magenta | pale bright | pale bright | pale bright |
| 0 | 1 | 0 | green-cyan | pale bright | deep dark | deep dark |
| 0 | 1 | 1 | blue-cyan | pale bright | deep bright | deep bright |
| 1 | 0 | 0 | white, black, red | deep bright | pale dark | pale dark |
| 1 | 0 | 1 | blue, green, yellow | deep bright | pale bright | pale dark |
| 1 | 1 | 0 | magenta, green | deep bright | deep dark | deep dark |
| 1 | 1 | 1 | cyan | deep bright | deep bright | deep dark |

As shown in Table 2, when the input signal R, G and B, are, for instance, at "H", "L" and "L", the outputs of the color difference signal generator circuit 23, B-Y, R-Y, are "0" and "1", respectively, to display the color difference signal for red display shown in FIG. 2. At this time, when the flip-flops BW, NB and LT for color control are all "L" while the priority pattern signal P is "H", the OR gate 10 is "L" level and the NOR gate 11 which determines the impedance at the terminal Z is "H" to select the transistor Q3. Consequently, the impedance at the terminal is rendered r plus R2 and the amplitude value to display a pale color is assigned to the color difference signal of red which is supplied to the modulation circuit. On the other hand, since the AND gate 32 is rendered "H", V4 level is selected in the level generating circuit 35 to transmit the bright level to the terminal VIDEO. As a result, when signals R, G, B and P are "H", "L", "L" and "H" and when flip-flops BW, NB and LT are all "L", pale-bright color of red is displayed on the elements which form designated patterns. Further, when the signals R, G and B are "H", "L" and "L" and when flip-flops BW, NB and LT for color control are all "L", the output from the OR gate 10 is shifted to "H" level to close the NOR gate 11 but to open the NOR gate 12, thereby setting the impedance at the terminal Z to a value (r+R2) which is for the same pale color as before and keeping the signal level transmitted from the level generating circuit to terminal VIDEO at V4 of bright level as before. When the color control flip-flop NB becomes "H" level, since NOR gate 12 is closed, the transistor Q3 is cut off. Accordingly, at this time the highest value of the impedance R3 appears at the terminal Z to maximize the amplitude of the color signal, thereby displaying the deep colors. Since the NAND gate 24 which selects the input terminals of the level generating circuit is closed and since the output of the NOR gate 27 becomes "H" level, a dark level of V2 level is produced from terminal VIDEO to display deep-dark color of red on picture elements for designated patterns. When the output of the flip-flop LT for color control or the signal for designating bright color displays becomes "H" level, the AND gate 26 is opened to render the NOR gate 27 "L". Therefore, bright color of the V4 level in the level generating circuit is selected to be transmitted from the terminal VIDEO, thereby displaying a deep-bright color of red when color control flip-flop BW, NB and LT are "L", "H" and "H". When the color control flip-flops BW, NB and LT are "H", "L" and "H", respectively, the NOR gate 11 is opened to set the impedance for pale colors, r+R2, thereby displaying pale-bright color of red. The color signals which result from the phase modulation of the color difference signals from the color difference signal generator circuit 23 with the chrominance subcarrier can be controlled by combining R, G and B signals to provide deep-bright, deep-dark, pale-bright and pale-dark properties of color, thereby enabling color display of $8\times4=32$ colors as well as of three colors of black, white and gray. Therefore, the total of 35 colors can be displayed.

Gray color is displayed when R, G, B and P signals are all "L" level and flip-flops BW, NB and LT are all "L" level so that V3 gray level signal is produced from the level generating circuit 35 to the terminal VIDEO.

It is obvious from FIG. 1 that the difference in deep, pale, bright, dark properties can be determined for the background colors which are displayed when there are no color data of R, G and B signals (or there are no patterns displayed) by the flip-flops BW, NB and LT for color control at the logical conditions shown in Table 2, respectively.

The display colors are tabulated according to the logical values of R, G, B, P and BW signals as shown in Table 3.

TABLE 3

| R | G | B | P | BW | Color displayed |
|---|---|---|---|---|---|
| 0 | 0 | 0 | 0 | 0 | When background, BGG, BGR and BGB are "L", blue-cyan<br>When background, BGR, BGG and BGB are "H", orange |
| 0 | 0 | 0 | 0 | 1 | When background, BGR, BGG and BGB are "L", black<br>When background, BGR, BGG and BGB are "H", white |
| 0 | 0 | 0 | 1 | 0 | blue-cyan |
| 0 | 0 | 0 | 1 | 1 | black |
| 0 | 0 | 1 | — | — | blue |
| 0 | 1 | 0 | — | — | green |
| 0 | 1 | 1 | — | — | green-cyan |
| 1 | 0 | 0 | — | — | red |
| 1 | 0 | 1 | — | — | magenta |
| 1 | 1 | 0 | — | — | yellow |
| 1 | 1 | 1 | — | 0 | orange |
| 1 | 1 | 1 | — | 1 | white |

in Table 3, the symbol "O" denotes "L" level and "1" "H" level while "-" indicates that either "H" or "L" level will do.

Symbols R, G, B and P herein denote the color data and the priority pattern display data which are programmed in the RAM together with Y and X coordinates and pattern names and which are read out sequentially according to the scanning order. The flip-flop BW and the flip-flops NB and LT for color control may be selected arbitrarily as far as they can function as a temporary memory storage which is controllable with any control systems such as CPU, software programs and/or manual operations.

As described in the foregoing, the colors in Table 3 listed according to the signal conditions of R, G, B, P and BW are controlled by the color control flip-flops NB and LT so that the amplitude of the chrominance subcarrier signal is controlled to change deep-pale properties of the display color or so that the input signals into the level generating circuit 35 are controlled to change the brightness of the display colors, thereby enabling the system according to the present invention to display a variety of color patterns with small memory capacity. Further since the control of deep, pale, bright and dark properties is carried out not simultaneously over the whole area of the display screen but carried out for one picture element by one picture element, each pattern based upon the change of colors can be displayed three-dimensionally or adjusted to be more favorite or close to natural order. By changing the number of flip-flops for color control of the present invention, color control of other types can be atained.

Figure 3:
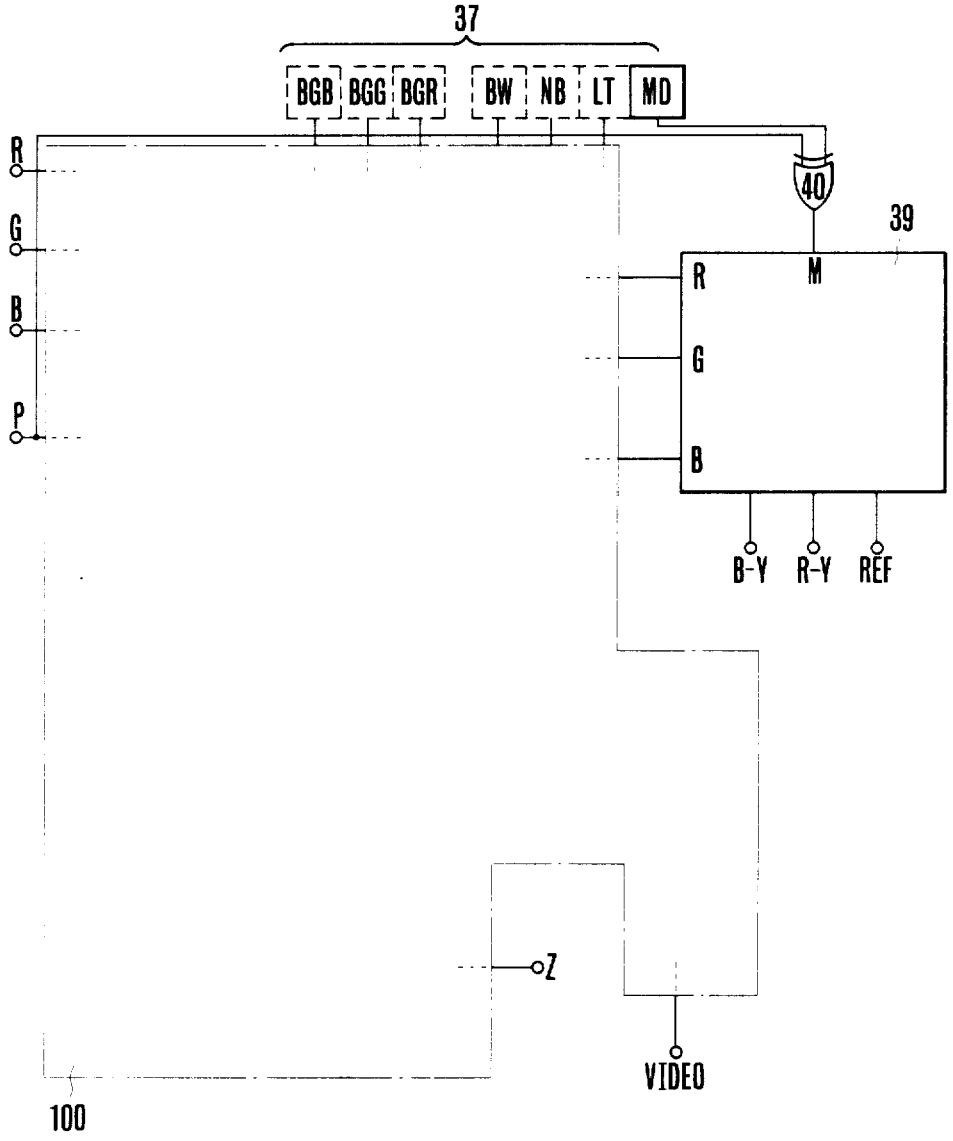
FIG. 3 is a circuit diagram showing another embodiment of the present invention.

FIG. 3 shows another embodiment of the present invention wherein one additional flip-flop for color control is provided for the logical circuit.

In FIG. 3, input terminals of R, G, B and P, groups for color control and background color display 37, the impedance output terminal Z and the VIDEO output terminal from the level generating circuit have the same functions as those shown in FIG. 1, and the circuit structure and the connection thereof encircled by broken lines 100 are identical with those shown in FIG. 1. In this embodiment, a flip-flop MD is newly added for color control and the output thereof is connected to an exclusive OR gate 40 together with the priority pattern display signal P, the output of the gate 40 being supplied to an input terminal M of a color difference signal generator circuit 39. Although the color conversion matrix, circuit system inside the color conversion generator circuit 39 is basically identical with the one shown in FIG. 1, the output terminals B-Y and R-Y transmit five levels of "2", "1", "0", "—1" and "—2". In this manner, 16 outputs can be obtained corresponding to logical conditions accruing from 4 input signals in combination. The input/output relation is shown below on Table 4.

TABLE 4

| M | R | G | B | B-Y | R-Y |
|---|---|---|---|---|---|
| 0 | 0 | 0 | 0 | 2 | −2 |
| 0 | 0 | 0 | 1 | 2 | 0 |
| 0 | 0 | 1 | 0 | −2 | −2 |
| 0 | 0 | 1 | 1 | 0 | −2 |

TABLE 4-continued

| M | R | G | B | B-Y | R-Y |
|---|---|---|---|---|---|
| 0 | 1 | 0 | 0 | 0 | 2 |
| 0 | 1 | 0 | 1 | 2 | 2 |
| 0 | 1 | 1 | 0 | −2 | 0 |
| 0 | 1 | 1 | 1 | −2 | 2 |
| 1 | 0 | 0 | 0 | 2 | −1 |
| 1 | 0 | 0 | 1 | 2 | 1 |
| 1 | 0 | 1 | 0 | −1 | −2 |
| 1 | 0 | 1 | 1 | 1 | −2 |
| 1 | 1 | 0 | 0 | −1 | 2 |
| 1 | 1 | 0 | 1 | 1 | 2 |
| 1 | 1 | 1 | 0 | −2 | −1 |
| 1 | 1 | 1 | 1 | −2 | 2 |

In Table 4, symbols M, R, G and B denote the input signals supplied to the color difference signal generator circuit 39 while B-Y, R-Y denote the output color signals thereof.

Figure 4:
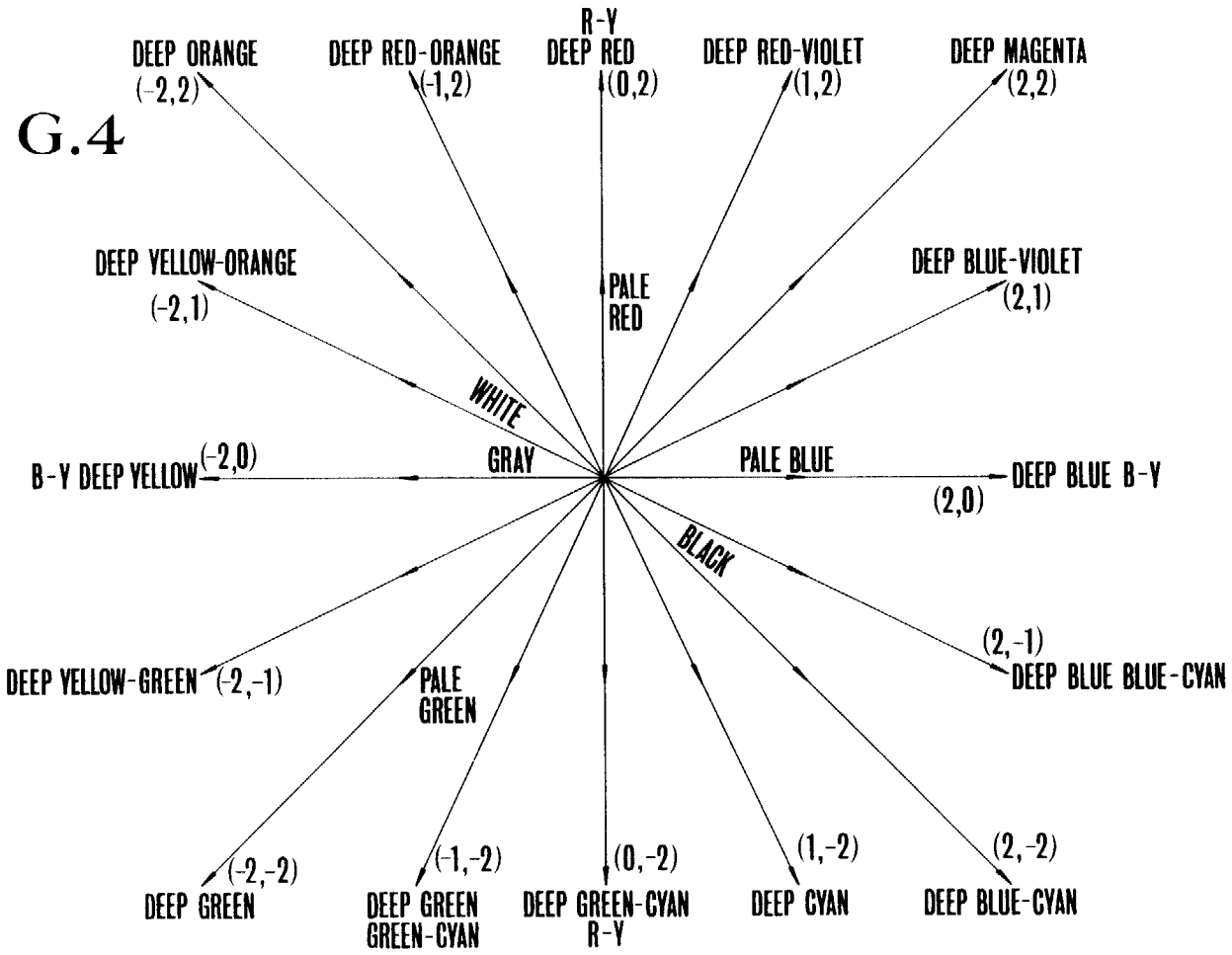
FIG. 4 is a vector diagram of chrominance subcarrier for the embodiment of FIG. 3.

The color vectors which can be displayed by the outputs of color signal in Table 4 are shown in FIG. 4.

Intermediate colors between adjacent color vectors in FIG. 2 can be displayed by increasing the number of input signals to the color difference signal generator circuit 39 by one. The input signal M supplied to the color difference generator circuit 39 is rendered "1", either when the color control flip-flop MD is "L" level ("0" level) and the priority pattern display signal P is "H" level ("1" level), or when the flip-flop level MD is "H" level ("1" level) and the priority pattern display signal P is "L" level ("0" level.). For combinations of P and MD, the input signal M is rendered "0". When the input M is "0", a logical condition which makes "1" and "2" correspond to "−1" and "−2" is established in the vector diagram shown in FIG. 2. Then, for the input M being "1", 8 intermediate colors listed in Table 4 can be obtained thereby making it possible to display 16 colors in total. Therefore, if the 16 colors are each subjected to four types of color control with deep-bright, deep-dark, pale-bright and pale-dark, 64 color patterns as well as white, black and grey can be displayed, increasing the number of colors up to 67. The relation therebetween is shown in FIG. 5.

In this manner, a large number of types of colors which are close to the natural color may be displayed by using multi-valued levels of the output from the color difference signal generator circuit.

It is obvious that the colors can be controlled in shade and brightness as effectively as the color control system according to the present invention even if the logical gates shown in FIGS. 1 and 3 are replaced by other types of gate. The amplitude of the chrominance subcarrier can be controlled in a more complexed manner by subdividing the impedance at the terminal Z. When there is no need to display background colors, the background color display flip-flop do not have to be utilized. Similarly, when there is no need to display the priority pattern, the P signal can be omitted. Even though the above members are omitted, a variety of color displays can be carried out with small capacity of memory by the provision of the circuit construction wherein the impedance value and level generating circuit can be controlled selectively for R, G, B color data signals by the control function of color control flip-flops.

Although the color burst signal is inserted during the horizontal blanking in the foregoing, a burst signal of 8 to 10 cycles which follows the horizontal synchronizing signal may be inserted via a burst gate. The present invention can be applied not only to MTSC system but also to PAL system by providing a burst generating gate which can switch over bursts and a color difference signal generator circuit which can switch over the phase of R-Y signal.

What is claimed is:

1. A pattern display system for use with color picture displays on a picture screen through random scanning comprising:

color signal generator means receiving color data and generating a color signal;

voltage level *control means having a plurality of information* of voltage levels for deciding a luminance of color; of amplitude control means having a plurality of information of amplitudes for deciding a saturation of color;

logical circuit means having a control signal storage circuit and a select signal generating circuit for generating a select signal which selects one of the plurality of information of voltage levels and one of the plurality of information of amplitudes based on the output of the control signal storage circuit; and transfer means of said color signal which has already been controlled of its amplitude and voltage level.

2. A pattern display system for use with color picture displays on a picture screen through random scanning comprising:

input terminals for receiving serial color data signals of red, green and blue;

an input terminal for receiving a serial control signal which designates a priority pattern display;

background color information storage means for storing and feeding background colors;

a color difference generator circuit for generating color signals based on the serial color data signals, background color information and serial control signal;

a modulation circuit for modulating the output of the color difference generator circuit;

a circuit for generating a voltage level signal representative of brightness level;

color control information storage means; and logical circuit means responsive to the color control information from the storage means and the serial control signal from the priority input terminal for applying to the voltage level generating circuit an output which controls the amplitude of the voltage level signal and applying to the modulation circuit an output which controls the amplitude of the color signals;

whereby, based on outputs of the modulation circuit and voltage level generating circuit, a color pattern display on predetermined picture elements can be effected with deep, pale, bright and dark properties of color controlled.

3. A pattern display system according to claim 2 wherein the output for controlling the amplitude of color signals is applied to the modulation circuit through variable impedance detecting means.

4. A pattern display system according to claim 2 wherein said color control information storage means comprises a storage for black and white display control information, a storage for information controlling the presence or absence of pattern, and a storage for information controlling brightness.

5. A pattern display system according to claim 2 wherein said color control information storage means comprises a storage for black and white display control information, a storage for information controlling the presence or absence of pattern, a storage for information controlling brightness, and a storage for information controlling intermediate color.

*6. A pattern display system for use with color displays on a picture screen through random scanning comprising:*

*color signal generator means receiving color data and generating a color signal;*

*voltage level control means independent from said color signal generating means having a plurality of information of voltage levels for deciding a luminance of color;*

*logical circuit means having a control signal storage circuit storing control signals different from said color data and a select signal generating circuit for generating a select signal which selects one of said plurality of information of voltage levels based on a combination of said control signals stored in said control storage circuit without changing said color data;*

*first transfer means of said color signal which has already been controlled of its voltage level; and second transfer means of the selected voltage level.*

*7. A pattern display system for use with color picture displays on a picture screen through random scanning comprising:*

*color signal generator means receiving color data and generating a color signal;*

*amplitude control means independent from said color signal generating means having a plurality of information of amplitudes for deciding a saturation of color;*

*logical circuit means having a control signal storage circuit storing control signals different from said color data and a select signal generating circuit for generating a select signal which selects one of said plurality of information of amplitudes based on a combination of said control signals stored in said control signal storage circuit without changing said color data; first transfer means of said color signal which has already been controlled of its amplitude level; and second transfer means of the selected amplitude information.*

*8. A pattern display system for use with color displays on a picture screen through random scanning comprising:*

*color signal generator means receiving red, green and blue color data and generating a difference signal B-Y and a difference signal R-Y color signals; voltage level control means independent from said color signal generating means having a plurality of information of voltage levels for deciding a luminance of color;*

*logical circuit means having a control signal storage circuit storing control signals different from said color data and a select signal generating circuit for generating a select signal which selects one of said plurality of information of voltage levels based on a combination of said control signals stored in said control signal storage circuit without changing said color data;*

*first transfer means of said color signal which has already been controlled of its voltage level; and*

*second transfer means of the selected level.*

*9. A pattern display system for use with color picture displays on a picture screen through random scanning comprising:*

*color signal generator means receiving R, G and B color data and generating B-V, R-V color signals;*

*amplitude control means independent from said color signal generating means having a plurality of information of amplitudes for deciding a saturation of color;*

*logical circuit means having a control signal storage circuit storing control signals different from said color data and a select signal generating circuit for generating a select signal which selects one of said plurality of information of amplitudes based on a combination of said control signals stored in said control signal storage circuit without changing said color data;*

*first transfer means of said color signal which has already been controlled of its amplitude level; and*

*second transfer means of the selected amplitude information.*

* * * * *